US012560277B2

(12) United States Patent (10) Patent No.: US 12,560,277 B2

Xu et al. (45) Date of Patent: Feb. 24, 2026

(54) DISPLAY MOUNTING SUPPORT

(71) Applicant: Xinadda (Hong Kong) Limited, Hong Kong (CN)

(72) Inventors: Hao Xu, Hong Kong (CN); Xunyi Yang, Hong Kong (CN); Lei Sun, Hong Kong (CN)

(73) Assignee: Xinadda (Hong Kong) Limited, Hong Kong (CN)

( * ) Notice: Subject to any disclaimer, the term of this patent is extended or adjusted under 35 U.S.C. 154(b) by 288 days.

(21) Appl. No.: 18/387,302

(22) Filed: Nov. 6, 2023

(65) Prior Publication Data

US 2025/0020271 A1 Jan. 16, 2025

(30) Foreign Application Priority Data

Jul. 12, 2023 (CN) .......................... 202321837196.0

(51) Int. Cl.
F16M 13/02 (2006.01)
(52) U.S. Cl.
CPC .................................. F16M 13/02 (2013.01)
(58) Field of Classification Search
CPC ........... F16M 13/02; A47G 1/20; A47G 1/162
USPC ..................................................... 248/475.1
See application file for complete search history.

(56) References Cited

U.S. PATENT DOCUMENTS

| | | | |
|---|---|---|---|
| 7,871,048 B2* | 1/2011 | Sculler ................... | F16M 13/02 |
| | | | 248/220.21 |
| 8,262,044 B2* | 9/2012 | Luijben .................. | F16M 11/10 |
| | | | 248/920 |
| 8,267,366 B2* | 9/2012 | Cheng .................. | F16M 11/046 |
| | | | 248/295.11 |
| 8,550,415 B2* | 10/2013 | Sculler ................ | H05K 5/0204 |
| | | | 248/495 |
| 9,829,151 B1* | 11/2017 | Stenhouse .............. | F16M 11/16 |
| 10,018,299 B2* | 7/2018 | Feldman ................ | F16M 11/22 |
| 11,432,664 B2* | 9/2022 | McDaniel .............. | A47G 1/205 |
| 12,163,621 B2* | 12/2024 | Xu .......................... | F16M 13/02 |

* cited by examiner

*Primary Examiner* — Todd M Epps
(74) *Attorney, Agent, or Firm* — IP SPRING

(57) ABSTRACT

The present disclosure provides a display mounting support, including a first wall plate assembly and a hanging hook assembly. The hanging hook assembly is configured for mounting on a back of a display. The first wall plate assembly includes a wall plate, a mounting portion and a hanging portion. The wall plate is configured to be set on a wall surface. The wall plate comprises a top end and a bottom end. The mounting portion is connected to the top end. The mounting portion defines a plurality of first mounting holes. A center axis of each first mounting hole is inclined downwardly from a top and far side of the wall surface to a bottom and near side of the wall surface. The hanging portion is connected to the bottom end, to mount the at least one hanging assembly. A load-bearing strength of the display mounting support is increased and more stable.

16 Claims, 16 Drawing Sheets

FIG. 6A                    FIG. 6B

DISPLAY MOUNTING SUPPORT

CROSS-REFERENCE TO RELATED APPLICATION(S)

This application claims priority under 35 U.S.C. § 119 (a) to and the benefit of Chinese Patent Application No. 202321837196.0, filed Jul. 12, 2023, the entire disclosure of which is incorporated herein by reference.

TECHNICAL FIELD

The present disclosure relates to a technical field of display mounting, and in particular relates to a display mounting support.

BACKGROUND

For different walls of a building, different mounting supports for a display may be required to mount the display on the wall. In the case of a wooden stud wall, there are gaps between the wooden studs. An outside of the wooden studs is usually decorated with plaster boards, wooden boards or the like. However, plaster boards, wooden boards or the like cannot bear loads by themselves. When the traditional wooden stud bolts are configured to mount the display on the wooden stud wall, the wooden stud bolts need to be nailed to the wooden studs, not to the plaster boards or the wooden boards, so the mount of the display mounting support needs to take into account the size of the gaps between the wooden studs. Also, the position of the display mounting support needs to be selected according to the position of the wooden studs, and the display may not be able to be installed in a center of the wall.

SUMMARY

For this purpose, the present disclosure describes a display mounting support to solve at least one of the above mentioned technical problems.

In order to solve the above mentioned technical problems, the technical solutions of the present disclosure are as follows:

The present disclosure describes a display mounting support. The display mounting support includes a first wall plate assembly and at least one hanging hook assembly. The at least one hanging hook assembly is configured to be mounted on a back of a display. The first wall plate assembly includes a wall plate, a mounting portion and a hanging portion. The wall plate is configured to be set on a wall surface. The wall plate includes a top end and a bottom end set opposite to the top end. The mounting portion is connected to the top end of the wall plate. The mounting portion defines a plurality of mounting holes. A center axis of each first mounting hole is inclined downwardly from a top and far side of the wall surface to a bottom and near side of the wall surface. The hanging portion is connected to the bottom end of the wall plate, and the hanging portion is configured to mount the at least one hanging assembly.

The beneficial effect of the present disclosure as compared to the prior art is as follows.

In the present disclosure, the plurality of first mounting holes are defined on the mounting portion of the first wall plate assembly, a plurality of fasteners pass through the plurality of first mounting holes, respectively. Since the plurality of first mounting holes are holes which are inclined from the top and far side of the wall surface to the bottom and near side of the wall surface, so that the fasteners are limited by the first mounting holes and can be nailed to the wall in a slanting way of which the fasteners are inclined from the top and far side of the wall surface to the bottom and near side of the wall surface. Moreover, the fasteners can be nailed to plaster boards, wooded boards, wooden studs, or a wall which has wooden studs inside and plaster boards on the surface for load bearing. Therefore, the display mounting support of the present disclosure can adapt different kinds of walls, and can be fixed at any positions of the wall without considering the size of the gaps between the wooden studs, solving a problem that the traditional display mounting support cannot be mounted in the center of the wall due to the consideration of the size of the gaps between the wooden studs. Moreover, as the first mounting holes are holes which are inclined from the top and far side of the wall surface to the bottom and near side of the wall surface, which makes the fasteners nailed to the wall in the slanting way of which the fasteners are inclined from the top and far side of the wall surface to the bottom and near side of the wall surface. Compared to the fasteners nailed horizontally to the wall, when the fasteners nailed in the slanting way of which the fasteners are inclined from the top and far side of the wall surface to the bottom and near side of the wall surface, the wall itself can provide further support to the fasteners, which makes the overall load-bearing performance of the display mounting support better, and the load-bearing strength of the display mounting support can be ensured and more stable.

BRIEF DESCRIPTION OF THE ACCOMPANYING DRAWINGS

To describe the technology solutions in the embodiments of the present disclosure more clearly, the following briefly introduces the accompanying drawings required for describing the embodiments. Obviously, the accompanying drawings in the following description show merely at least one embodiment of the present disclosure, those of ordinary skilled in the art may also obtain other drawings based on these drawings without any creative efforts.

DETAILED DESCRIPTION OF ILLUSTRATED EMBODIMENTS

Embodiments of the present disclosure are described in detail below. Examples of the embodiments are shown in the accompanying drawings. The same or similar labeling throughout denotes the same or similar elements or elements having the same or similar functions. The embodiments described below by reference to the accompanying drawings are exemplary and are intended to be configured to explain the present disclosure and are not to be construed as limiting the present disclosure.

Furthermore, the terms "first" and "second" are used for descriptive purposes only and are not to be understood as indicating or implying relative importance or implicitly specifying the number of technical features indicated. Therefore, a feature defined with "first" or "second" may include one or more such features, either explicitly or implicitly. In the description of the present disclosure, "more than one" means two or more, unless otherwise expressly and specifically limited.

In the present disclosure, unless otherwise expressly specified and limited, the terms "connected", "fixed", and the like are to be understood broadly, e.g., they may be fixedly connected, removably connected, or integrally connected; they may be mechanically connected or electrically connected; they may be directly connected or indirectly connected through an intermediate medium; they may be interconnected within two elements or an interactive relationship between two elements. For those of ordinary skill in the art, the specific meaning of the above terms in the present disclosure may be understood on a case-by-case basis.

Figure 1:
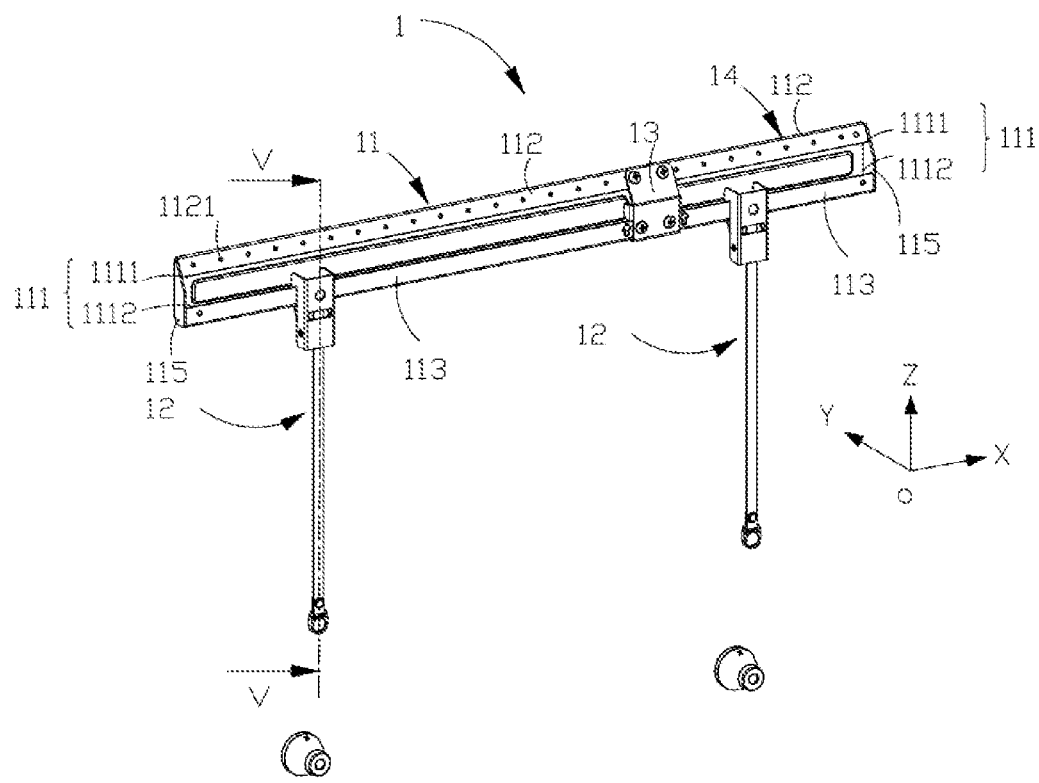
FIG. 1 is a three-dimensional structural schematic diagram of a display mounting support in accordance with a first embodiment of the present disclosure.
Figure 2:
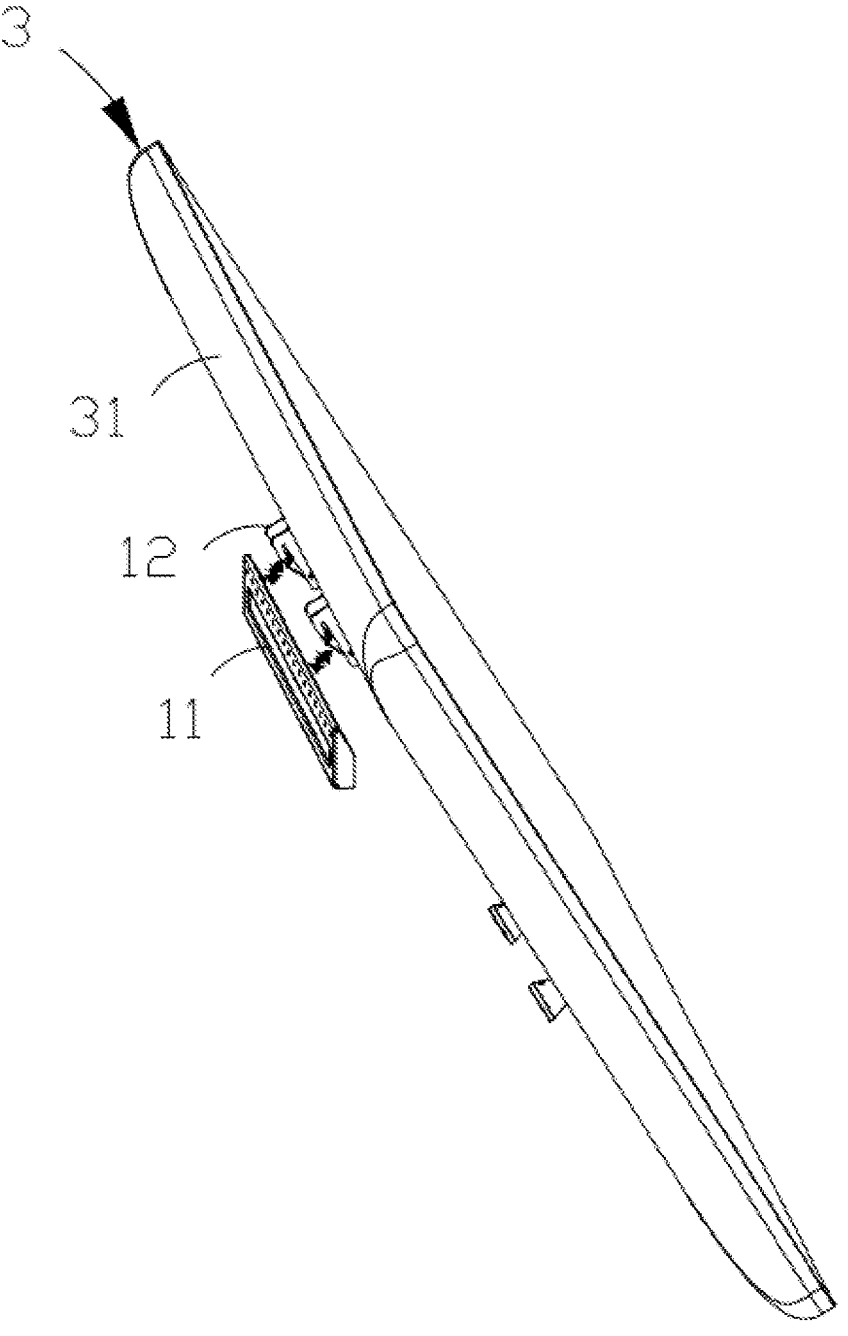
FIG. 2 shows a schematic diagram of mounting a display to a wall surface by using the display mounting support.

Referring to FIGS. 1 and 2, FIG. 1 is a three-dimensional structural schematic diagram of a display mounting support 1 in accordance with a first embodiment of the present disclosure; and FIG. 2 shows a schematic diagram of mounting a display 3 to a wall surface by using the display mounting support 1. The present disclosure protects the display mounting support 1. The display mounting support 1 is configured to fix a display 3 to a wall. In at least one embodiment, the display 3 may be, but is not limited to, a television set, a computer display, and the like, and the wall may be, but is not limited to, a wooden stud wall or other type of wall.

For ease of description, the display mounting support 1 shown in FIG. 1 is defined to have a length direction in an X-axis direction, a thickness direction in a Y-axis direction, and a height direction in a Z-axis direction. The "top", "bottom", "left", "right" and the like mentioned in the description of the display mounting support 1 in the embodiment of the present disclosure are based on the orientation shown in FIG. 1 of the accompanying drawings of the specification, with a direction towards a positive direction of the Z-axis as the "top", a direction towards a negative direction of the Z-axis as the "bottom", a direction towards a negative direction of the X-axis as the "left" and a direction towards a positive direction of the X-axis as the "right", which does not limit the display mounting support 1 in an actual application scene.

Figure 3:
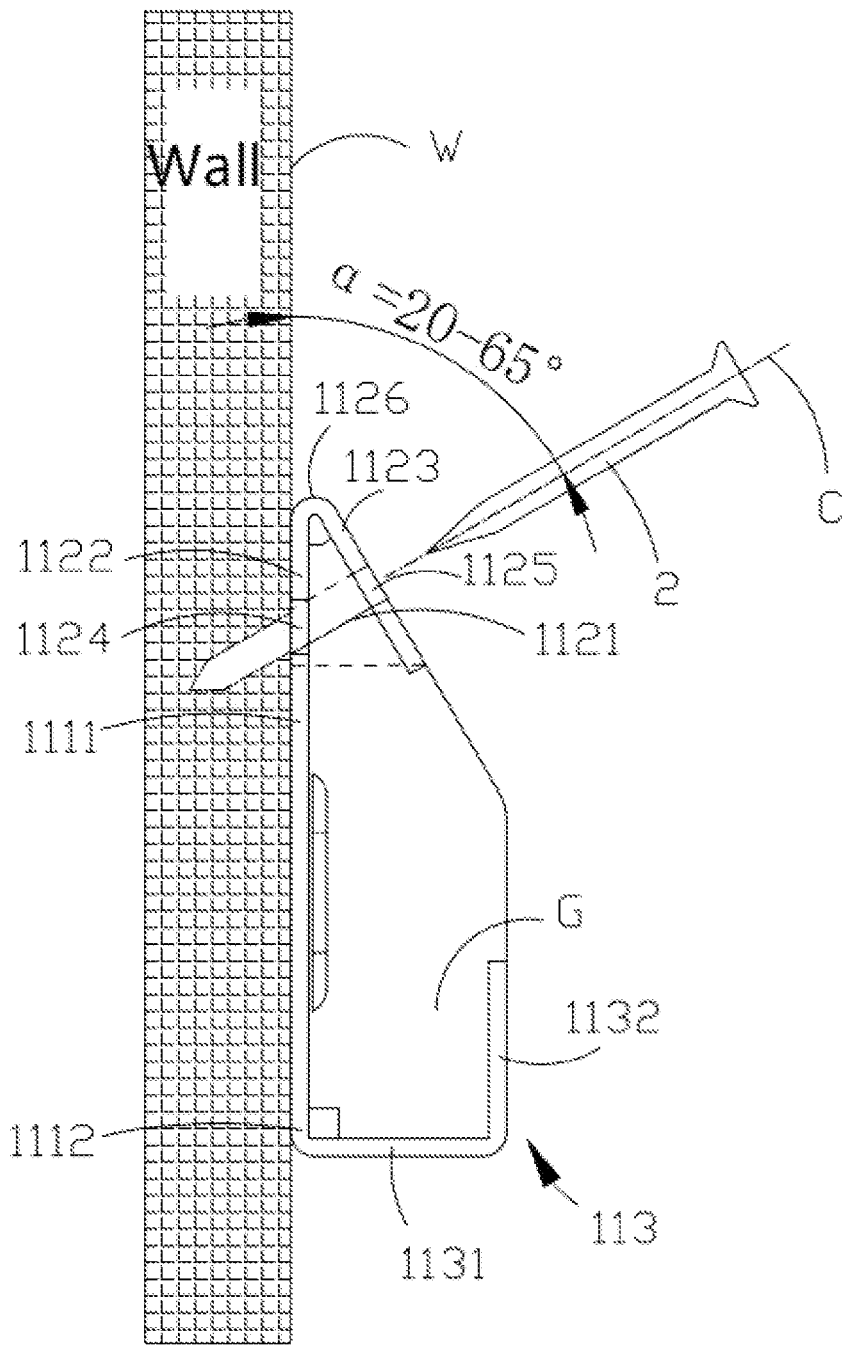
FIG. 3 shows a schematic diagram of fixing the display mounting support to a wall surface in accordance with a first embodiment of the present disclosure.

The display mounting support 1 includes a first wall plate assembly 11 and at least one hanging hook assembly 12. The first wall plate assembly 11 includes a wall plate 111, a mounting portion 112 and a hanging portion 113. The wall plate 111 is configured to be set on a wall surface W (as shown in FIG. 3). The wall plate 111 includes a top end 1111 and a bottom end 1112 opposite to the top end 1111. The mounting portion 112 is connected to the top end 1111 of the wall plate 111. The mounting portion 112 defines a plurality of first mounting holes 1121. Referring to FIG. 3, FIG. 3 shows a schematic diagram of the display mounting support 1 to a wall surface W in accordance with a first embodiment of the present disclosure. A center axis C of each first mounting hole 1121 is inclined from a top and far side of the wall surface W to a bottom and near side of the wall surface W. Each first mounting hole 1121 allows a fastener 2 to pass through it and then to be nailed to the wall surface W inclined from the top and far side of the wall surface W to the bottom and near side of the wall surface W. The hanging portion 113 is connected to the bottom end 1112. The hanging portion 113 is configured to mount the at least one hanging hook assembly 12. When the first wall plate assembly 11 is mounted on the wall surface W, the at least one hanging hook assembly 12 is fixed to a back 31 of the display 3, the at least one hanging hook assembly 12 are mounted on the first wall plate assembly 11, the display 3 can be hung by the at least one hanging hook assembly 12 on the first wall plate assembly 11, and the display 3 can be hung on the wall surface W via the at least one hanging hook assembly 12 and the first wall plate assembly 11.

In the present disclosure, the mounting portion 112 of the first wall plate assembly 11 defines the plurality of first mounting holes 1121, and the plurality of fasteners 2 pass through the plurality of first mounting holes 1121, respectively. Since the plurality of first mounting holes 1121 are holes which are inclined from the top and far side of the wall surface W to the bottom and near side of the wall surface W, therefore, the first mounting holes 1121 limit the fasteners 2 so that the fasteners 2 can be nailed to the wall in a slanting way of which the fasteners 2 are inclined from the top and far side of the wall surface W to the bottom and near side of the wall surface W. Furthermore, the fasteners 2 can be nailed to plaster boards, wooded boards, wooden studs, or a wall which has wooden studs inside and plaster boards on surface for load-bearing. Therefore, the display mounting support 1 can adapt different kinds of wall, without considering the size of the gap between the wooden studs. Therefore, the display mounting support 1 can be fixed at any position of the wall, solving a problem that the traditional display mounting support cannot be mounted in a center of the wall due to the consideration of the gap between the wooden studs. Moreover, due to the first mounting holes 1121 are inclined from the top and far side of the wall surface W to the bottom and near side of the wall surface W, so that the fasteners 2 are nailed to the wall surface in the slanting way of which the fasteners 2 are inclined from the top and far side of the wall surface W to the bottom and near side of the wall surface W. Compared to the fasteners 2 being nailed horizontally to the wall surface, when the fasteners 2 are nailed to the wall surface in the slanting way of which the fasteners 2 are inclined from the top and far side of the wall surface W to the bottom and near side of the wall surface W, the wall itself can provide further support to the fasteners 2, which makes the overall load-bearing performance of the display mounting support 1 better, and the load-bearing strength of the display mounting support 1 can be ensured, and more stable.

Referring to FIG. 3, there is an angle α between the center axis C of the first mounting hole 1121 and the wall surface W. In at least one embodiment, the angle α is 20-65°.

Therefore, the first mounting hole 1121 enables the fasteners 2 to be nailed to the wall at an inclined angle of 20-65° relative to the wall surface W, which not only ensures a load-bearing capacity of the display mounting support 1 provided by the plurality of fasteners 2, but also facilitates the user to mount the display mounting support 1 onto the wall surface W smoothly.

In at least one embodiment, in order to further improve a load-bearing strength of the plurality of fasteners 2 loading the display mounting support 1, the angle α is limited to within 20-55°.

In at least one embodiment, referring again to FIG. 1, the plurality of first mounting holes 1121 are defined on the mounting portion 112 at uniformly spaced intervals along the X-axis direction, and furthermore, the center axes C of the plurality of first mounting holes 1121 are parallel to each other.

Therefore, since the plurality of first mounting holes 1121 are defined on the mounting portion 112 at equal intervals, and the center axes C of the plurality of first mounting holes 1121 are parallel to each other, the display mounting support 1 can be conveniently mounted, and furthermore, the display mounting support 1 has the same load-bearing strength at different positions in the X-axis direction, and the overall load bearing of the display mounting support 1 is more uniform.

In at least one embodiment, the fasteners 2 are steel nails. In other embodiments, the fasteners 2 may be other types of fasteners that can be nailed directly into the wall, without limitation herein.

In at least one embodiment, referring again to FIG. 3, the mounting portion 112 includes a first connecting portion 1122 and a first bending portion 1123. The first connecting portion 1122 is connected to the top end 1111 of the wall plate 111 and extends from the top end 1111 of the wall plate 111 to a side far from the bottom end 1112 of the wall plate 111. The first bending portion 1123 is bent from the first connection portion 1122 to a side back from the wall surface W and is inclined relative to the first connection portion 1122. The first connection portion 1122 defines a plurality of first through holes 1124. The first bending portion 1123 defines a plurality of second through holes 1125. A first prong 1126 is formed at a connection position of the first connection portion 1122 and the first bending portion 1123. A distance between a center point of the first through hole 1124 and the first prong 1126 is greater than a distance between a center point of the second through hole 1125 and the first prong 1126. The first through hole 1124 and the second through hole 1125 together form the first mounting hole 1121. That is, although the first mounting hole 1121 is a hole inclined from the top and far side of the wall surface W to the bottom and near side of the wall surface W, the first through hole 1124 and the second through hole 1125 for forming the first mounting hole 1121 are straight holes. Compared to an inclined hole, the straight hole is simpler to form and can be directly molded using, for example, a stamping process, and thus are less expensive to manufacture.

In at least one embodiment, the first through hole 1124 being a straight hole means that a center axis of the first through hole 1124 is set vertically with respect to surfaces of the first connecting portion 1122. The second through hole 1125 being a straight hole means that a center axis of the second through hole 1125 is set vertically with respect to surfaces of the first bending portion 1123.

It can be understood that in other embodiments, the first through hole 1124 may be an inclined hole, i.e., the center axis of the first through hole 1124 may be inclined with respect to the surfaces of the first connecting portion 1122; the second through hole 1125 may be an inclined hole, i.e., the center axis of the second through hole 1125 may be inclined with respect to the surface of the first bending portion 1123, without limitation herein.

In at least one embodiment, referring to FIG. 3 again, the hanging portion 113 includes a bottom wall 1131 and a first plate 1132. The bottom wall 1131 is bent and extended from the bottom end 1112 of the wall plate 111, and the first plate 1132 is bent and extended from one end of the bottom wall 1131 far from the wall plate 111 and is in parallel with the wall plate 111. The wall plate 111, the bottom wall 1131, and the first plate 11 cooperatively form a U-shaped groove G. A portion of the hanging hook assembly 12 is located inside the U-shaped groove G, and another portion is located outside the U-shaped groove G. The hanging hook assembly 12 is capable of sliding along the U-shaped groove G. The U-shaped groove G guides the sliding of the hanging hook assembly 12. The U-shaped groove G plays a guiding role of guiding the hanging hook assembly 12. The bottom wall 1131 serves as a restriction for the hanging hook assembly 12, so that the hanging hook assembly 12 will not detach from the U-shaped groove G.

Therefore, the hanging and limiting functions of the hanging hook assembly 12 can be realized by the hanging portion 113.

Figure 4:
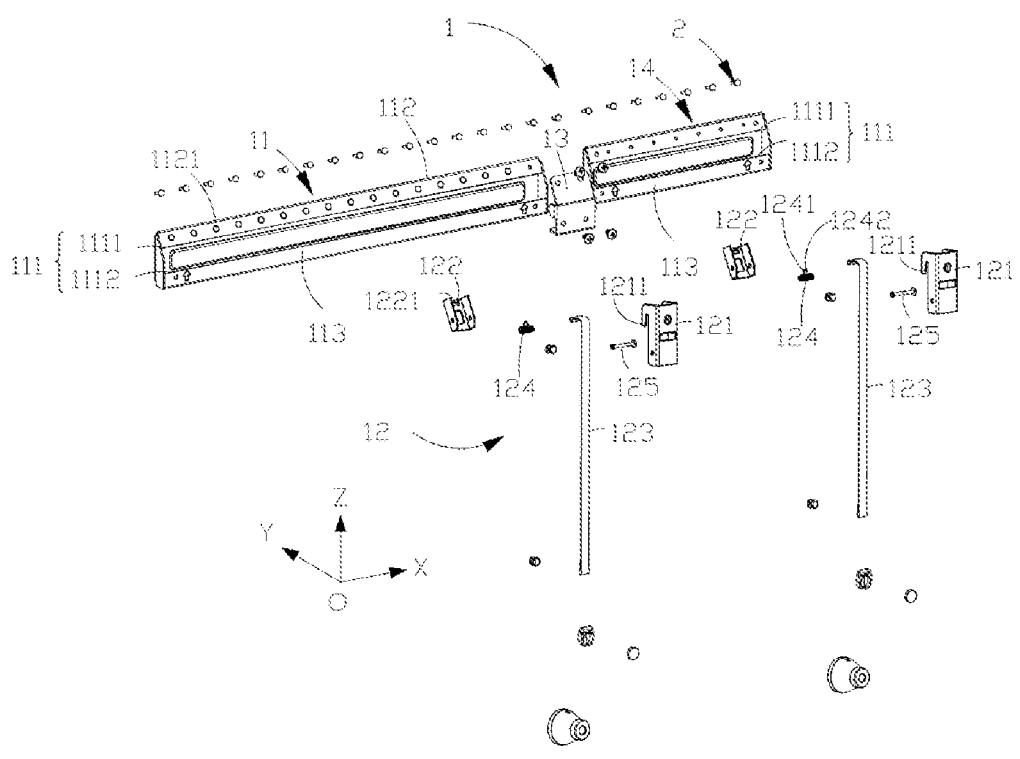
FIG. 4 shows an exploded view of the display mounting support in accordance with a first embodiment of the present disclosure.
Figure 5:
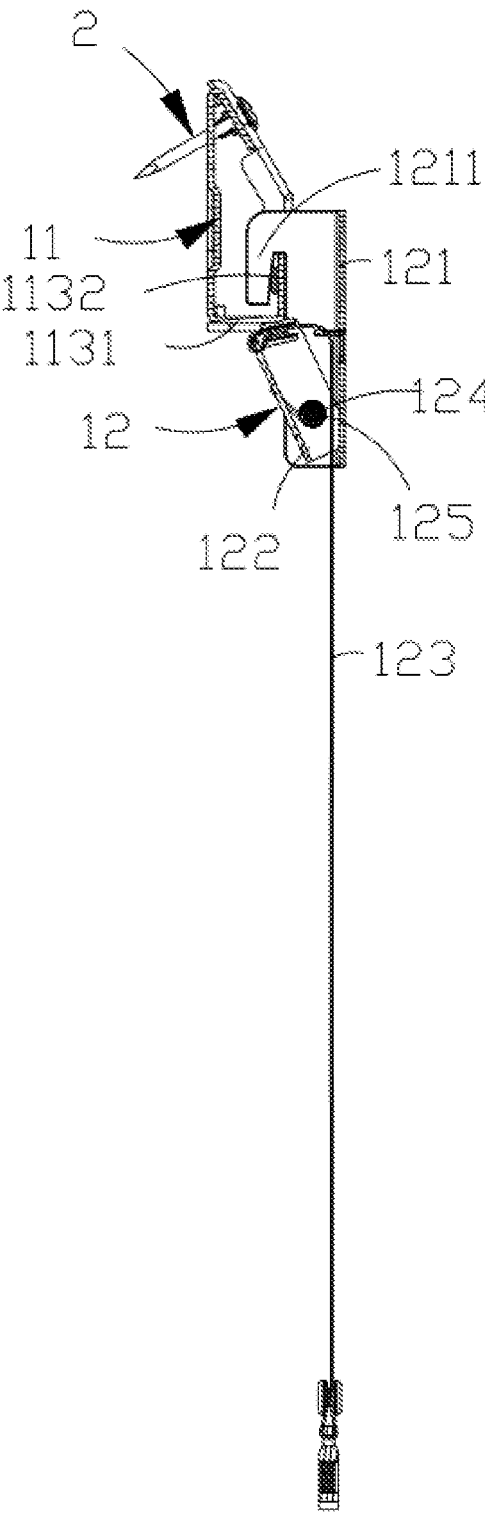
FIG. 5 shows a cross-sectional diagram of the display mounting support in FIG. 1 taken along a line V-V.

Referring to FIGS. 4 and 5 together, FIG. 4 shows an exploded view of the display mounting support 1 in accordance with a first embodiment of the present disclosure; FIG. 5 shows a cross-sectional diagram of the display mounting support 1 in FIG. 1 taken along a line V-V. The hanging hook assembly 12 includes a first housing 121, a second housing 122, a pull rope 123, and a torsion spring 124. The first housing 121 includes a hanging hook 1211 located at a top end of the first housing 121. A bottom end of the second housing 122 is pivotally connected to a bottom end of the first housing 121. The torsion spring 124 is located between the first housing 121 and the second housing 122, and adjacent to the bottom end of the first housing 121 and the bottom end of the second housing 122. The torsion spring 124 has a first free end 1241 and a second free end 1242. The first free end 1241 and the second free end 1242 are pressed against an inner wall of the first housing 121 and an inner wall of the second housing 122, respectively, so that the first housing 121 and the second housing 122 are in a shape of an opening with a large top and a small bottom in a natural state due to the pressed against the first free end 1241 and the second free end 1242 respectively. The pull rope 123 is connected to the top of the second housing 122 and passes through a space between the bottom end of the first housing 121 and the bottom end of the second housing 122.

In at least one embodiment, the bottom end of the second housing 122 is pivotally connected to the bottom end of the first housing 121 by a rotating shaft. Specifically, in this embodiment, the hanging hook assembly 12 further includes a rotating shaft 125. The rotating shaft 125 pivotally connects the first housing 121 to the second housing 122, and the torsion spring 124 is sleeved on the pivoting shaft 125. It can be understood that, in other embodiments, the bottom end of the second housing 122 pivotally connected to the bottom end of the first housing 121 may use other ways, which is not limited herein.

Therefore, by using the rotating shaft 125, not only the pivotal connection between the first housing 121 and the second housing 122 can be realized, but also the limitation of the torsion spring 124 can be realized, so as to avoid the torsion spring 124 floating up and down in the space between the first housing 121 and the second housing 122.

In at least one embodiment, the pull rope 123 connected to the top of the second housing 122 refers to one end of the pull rope 123 being fixedly connected to the top of the second housing 122. Specifically, in this embodiment, the top of the second housing 122 defines a first connecting hole 1221, one end of the pull rope 123 passes through the first connecting hole 1221, and the end of the pull rope 123 that passes through the first connecting hole 1221 is fastened to a portion of the pull rope 123 that does not pass through the first connecting hole 1221 by a snap connector.

It can be understood that in at least one embodiment, the pull rope 123 is a pull rope made of a material such as nylon.

Therefore, a stable and reliable connection is formed between the pull rope 123 and the top of the second housing 122.

In at least one embodiment, both the first housing 121 and the second housing 122 are roughly U-shaped housings, i.e., the first housing 121 and the second housing 122 each have a plate body and sidewalls protruding from opposite ends of the plate body respectively. Thus, when the first housing 121 is rotatably connected to the second housing 122, a receiving space is formed between the first housing 121 and the second housing 122.

In at least one embodiment, the hanging hook 1211 is formed by extending from a top of the first housing 121 to a side near the second housing 122, and then bending toward a bottom of the first housing 121.

In at least one embodiment, the first housing 121 and the second housing 122 respectively defines one or more hollowed portions, which on the one hand can reduce weight, and on the other hand facilitate observation of the working condition of the torsion spring 124 and the pull rope 123 in the receiving space between the first housing 121 and the second housing 122.

Figure 6:
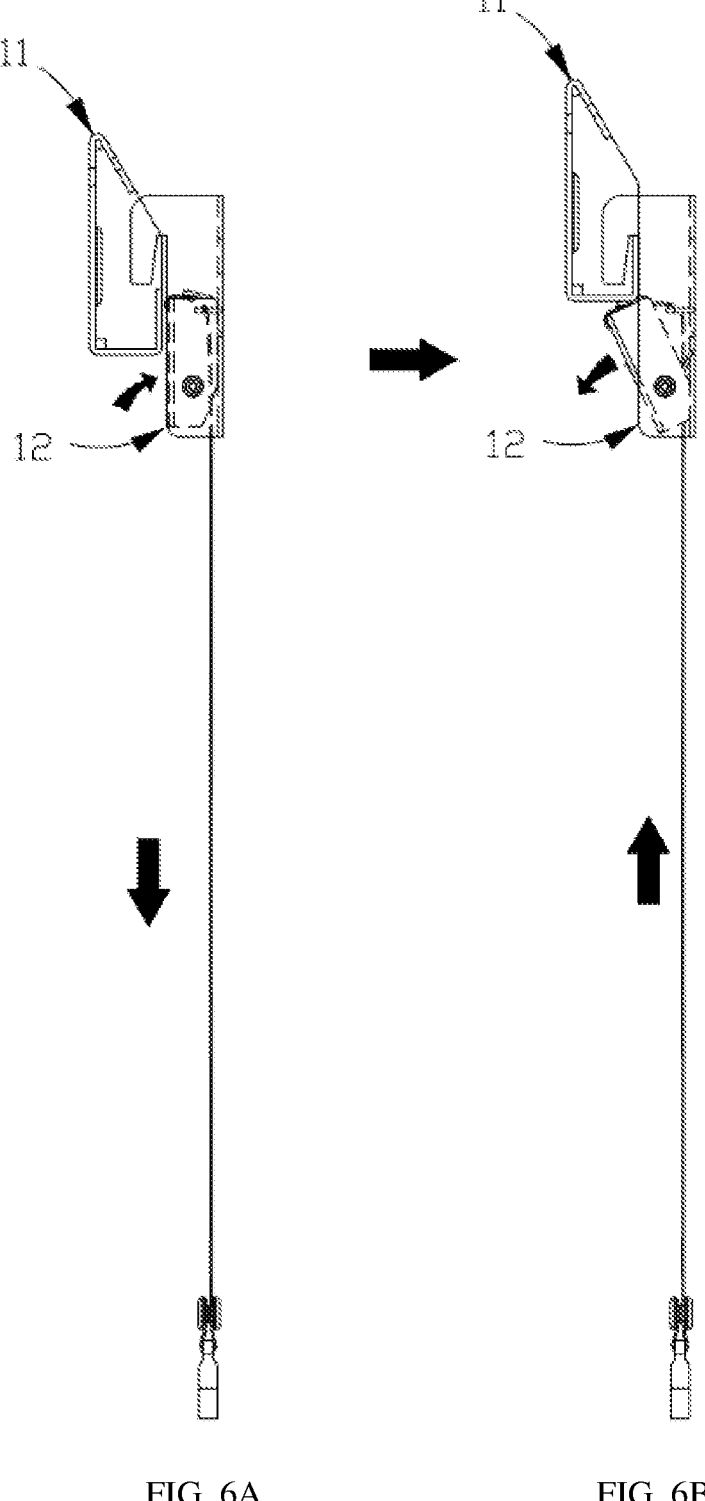
FIG. 6A and FIG. 6B are schematic diagrams of a process of mounting a hanging hook assembly to a first wall plate assembly in accordance with a first embodiment of the present disclosure.

Referring to FIGS. 6A and 6B together, FIG. 6A and FIG. 6B are schematic diagrams of a process of mounting a hanging hook assembly 12 to a first wall plate assembly 11 in accordance with a first embodiment of the present disclosure. When the hanging hook assembly 12 needs to be mounted on the first wall plate assembly 11, the hanging hook assembly 12 is first fixed to the back 31 of the display 3, and then, the display 3 and the hanging hook assembly 12 are together moved near the first wall plate assembly 11, so that the hanging hook 1211 of the hanging hook assembly 12 is firstly snapped in the U-shaped groove G from top to bottom; at this time, the side of the second housing 122 far from the first housing 121 is held against the outer side of the first plate 1132; the pulling rope 123 is pulled to make the second housing 122 rotate toward a side near the first housing 121, and the torsion spring 124 is compressed so that the outer surface of the first housing 121 is roughly parallel to the outer surface of the second housing 122, and the side of the second housing 122 adjacent to the first plate 1132 is held against the outer side of the first plate 1132. At this time, the pull rope 123 is released, and the second housing 122 is driven to rotate toward a side far from the first housing 121 due to the elastic restoring force of the torsion spring 124, so that the second housing 122 rests against the bottom wall 1131 and achieves a limiting effect.

Figure 7:
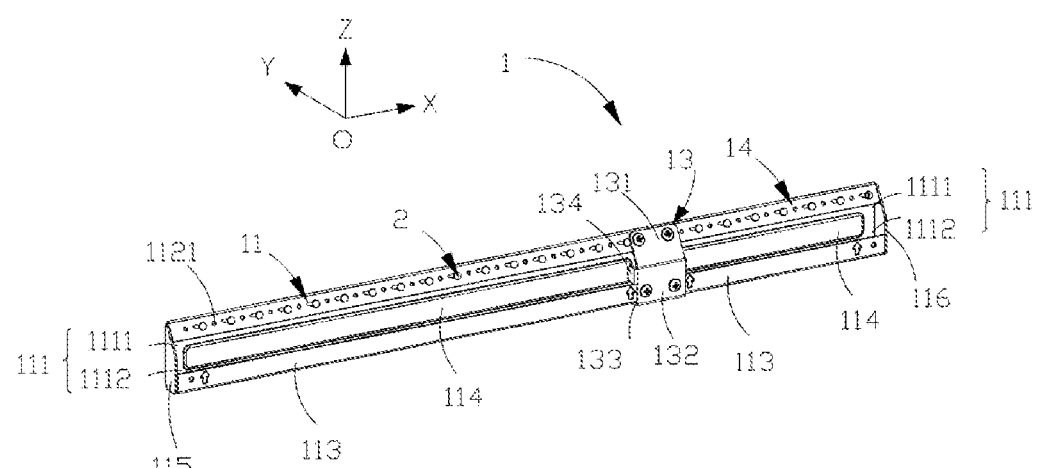
FIG. 7 shows a schematic structural diagram in which the first wall plate assembly and a second wall plate assembly are connected with a connecting member in accordance with a first embodiment of the present disclosure.

In at least one embodiment, referring together to FIG. 7, the wall plate 111 further includes a reinforcing structure 114. The reinforcing structure 114 is configured to enhance an overall structural strength of the display mounting support 1.

In at least one embodiment, the reinforcing structure 114 may be, but is not limited to, reinforcement bars, protrusions, and the like. In this embodiment, the reinforcing structure 114 is a protrusion that extends from a side of the wall plate 111 far from the wall surface W to a side of the wall surface W that is proximate to the wall surface W.

In this embodiment, the reinforcing structure 114 includes a protrusion. It can be understood that in other embodiments, the reinforcing structure 114 includes a plurality of spaced apart protrusions, which are not limited herein.

In at least one embodiment, referring to FIG. 1, the first wall plate assembly 11 includes two outer sidewalls 115 disposed along the X-axis direction. The two outer sidewalls 115 are located on opposite ends of the wall plate 11 along the X-axis direction, and the two outer sidewalls 115 are smoothly coupled to the mounting portion 112 and the hanging portion 113, respectively.

Specifically, the shape of the outer sidewalls 115 is adapted to the shape of the mounting portion 112 and the hanging portion 113, i.e., the shape of the outer sidewalls 115 adjacent to the mounting portion 112 is also inclined so as to adapt to a slanting surface of the first bending portion 1123 of the mounting portion 112; the shape of the outer sidewalls 115 adjacent to the hanging portion 113 is also shaped as a straight plate so as to accommodate the shape of the first plate 1132 of the hanging portion 113. Thus, the shape of the outer sidewall 115 is substantially trapezoidal.

In at least one embodiment, referring again to FIGS. 1, 4, and 7, the display mounting support 1 further includes a second wall plate assembly 14 and a connecting member 13. The second wall plate assembly 14 has a same structure as the first wall plate assembly 11. As shown in FIG. 7, the connecting member 13 includes a first abutment portion 131, a second abutment portion 132, and a third abutment portion 133. The first abutment portion 131 abuts against and secures to the mounting portion 112 of the first wall plate assembly 11 and the mounting portion 112 of the second wall plate assembly 14. The second abutment portion 132 abuts against the adjacent outer sidewalls 115 of the first wall plate assembly 11 and the second wall plate assembly 14. The third abutment portion 133 abuts against and secures to the hanging portion 113 of the first wall plate assembly 11 and the hanging portion 113 of the second wall plate assembly 14.

Therefore, the display mounting support 1 can be optimized in three aspects by using the connecting member 13. Firstly, the display mounting support 1 can be extended in the X-axis direction when needed; secondly, the segmented design of the first wall plate assembly 11 and the second wall plate assembly 14 can reduce a package length of the display mounting support 1, which is convenient for packing; thirdly, the display mounting support 1 can adapt different sizes of the display 3. The second wall plate assembly 14 can be omitted if the display 3 can be mounted by the first wall plate assembly 11, which can reduce the cost.

In at least one embodiment, the connecting member 13 further includes a holding portion 134 provided on opposite sides of the second abutment portion 132, and the two holding portions 134 are respectively clamped on the wall plate 111 of the first wall plate assembly 11 and the wall plate 11 of the second wall plate assembly 14.

In at least one embodiment, the wall plate 111 includes the reinforcing structure 114 and the reinforcing structure 14 is a protrusion extending from a side of the wall plate 111 far from the wall surface W to a side proximate to the wall surface W. The two holding portions 134 snap onto the reinforcing structure 114 of the wall plate 111 of the first wall plate assembly 11 and the reinforcing structure 114 of the wall plate 11 of the second wall plate assembly 14, respectively.

Figure 8:
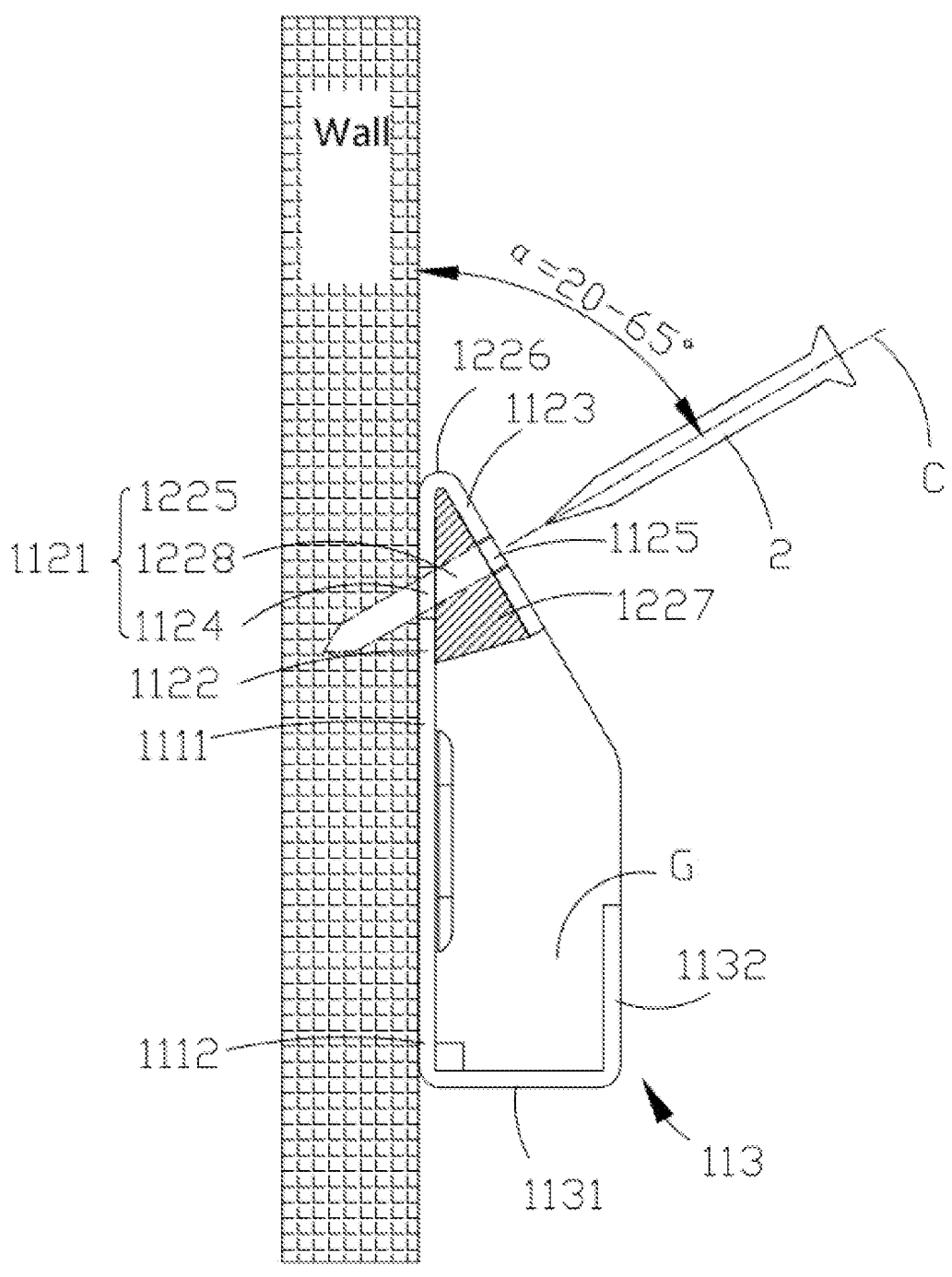
FIG. 8 shows a cross-sectional diagram of the display mounting support in accordance with a second embodiment of the present disclosure.

Referring to FIG. 8, FIG. 8 shows a cross-sectional diagram of the display mounting support in accordance with a second embodiment of the present disclosure. In the second embodiment, the mounting portion 112 further includes a first supporting member 1227. The first supporting member 1227 is located in a space between the first bending portion 1123 and the first connecting portion 1122. The first supporting member 1227 defines a third through hole 1228 corresponding to the first through hole 1124 and the second through hole 1125. The first through hole 1124, the second through hole 1125 and the third through hole 1228 cooperatively form the first mounting hole 1121.

Therefore, the first supporting member 1227 is located in the space between the first bending portion 1123 and the first connecting portion 1122. The first supporting member 1227 can support the first bending portion 1123. Furthermore, as the first supporting member 1227 defines the plurality of third through holes 1228, when the fastener 2 passes through the third through hole 1228, the third through hole 1228 can guide the fastener 2, which avoids a problem of the fastener 2 not passing through the first through hole 1124 smoothly after passing through the second through hole 1125, which facilitates installation and increases convenience.

In at least one embodiment, the first supporting member 1227 is in a shape of a triangular prism, which is compatible with a space between the first bending portion 1123 and the first connecting portion 1122.

In at least one embodiment, the first supporting member 1227 is made of materials such as plastic, rubber, etc., which has a cushioning effect and facilitates to process the third through hole 1228.

Figures 9, 10:
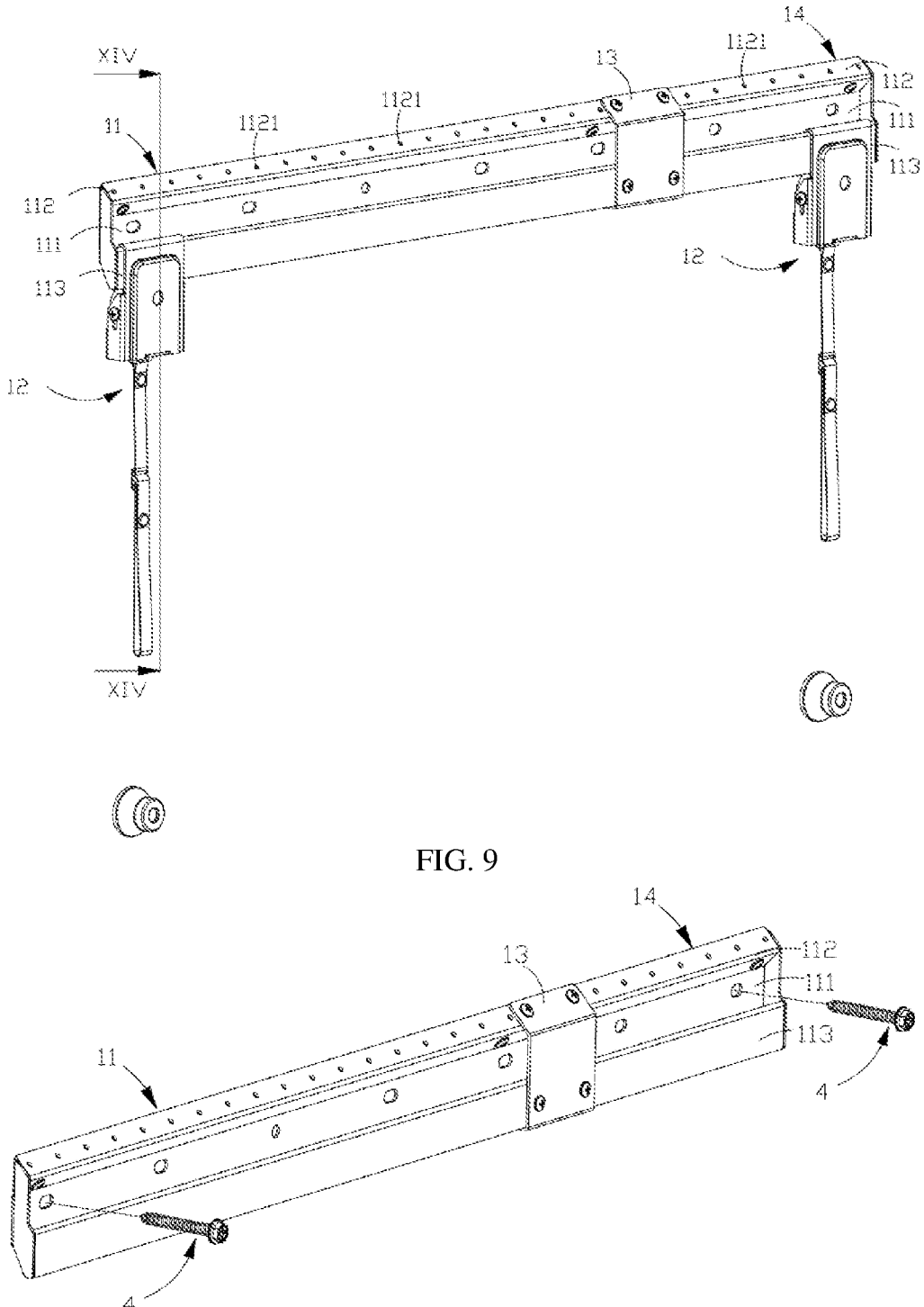
FIG. 9 shows a schematic structural diagram of the display mounting support in accordance with a third embodiment of the present disclosure.
FIG. 10 is a schematic structural diagram of the first wall plate assembly in accordance with a third embodiment of the present disclosure.
Figure 11:
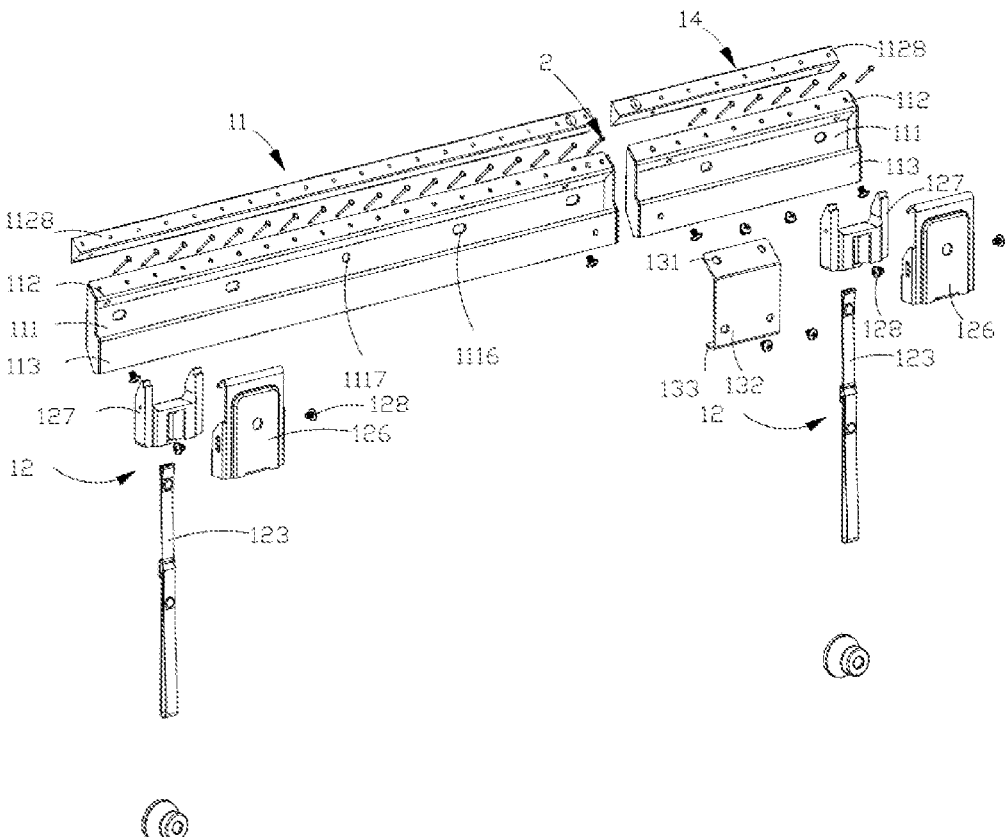
FIG. 11 is an exploded view of the display mounting support in accordance with a third embodiment of the present disclosure.
Figure 12:
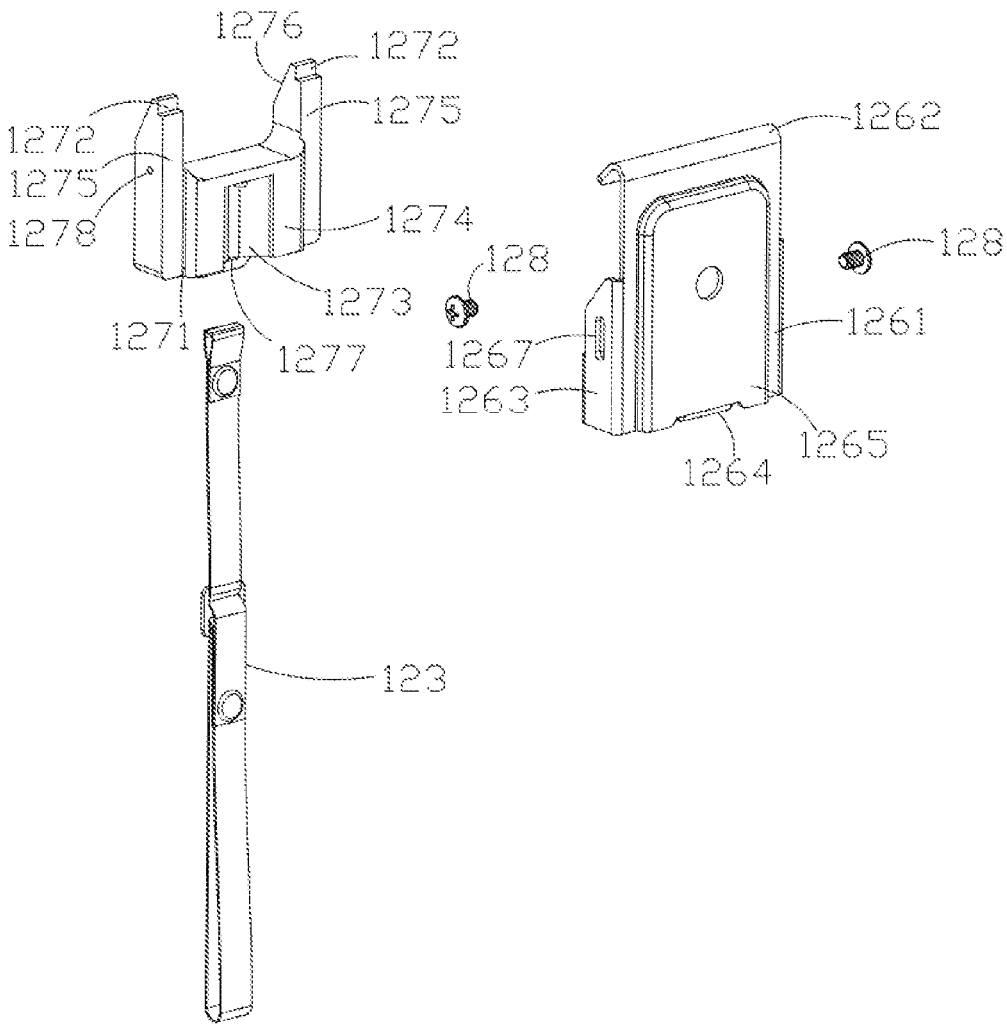
FIG. 12 shows an exploded view of a hanging hook assembly in accordance with a third embodiment of the present disclosure.
Figure 13:
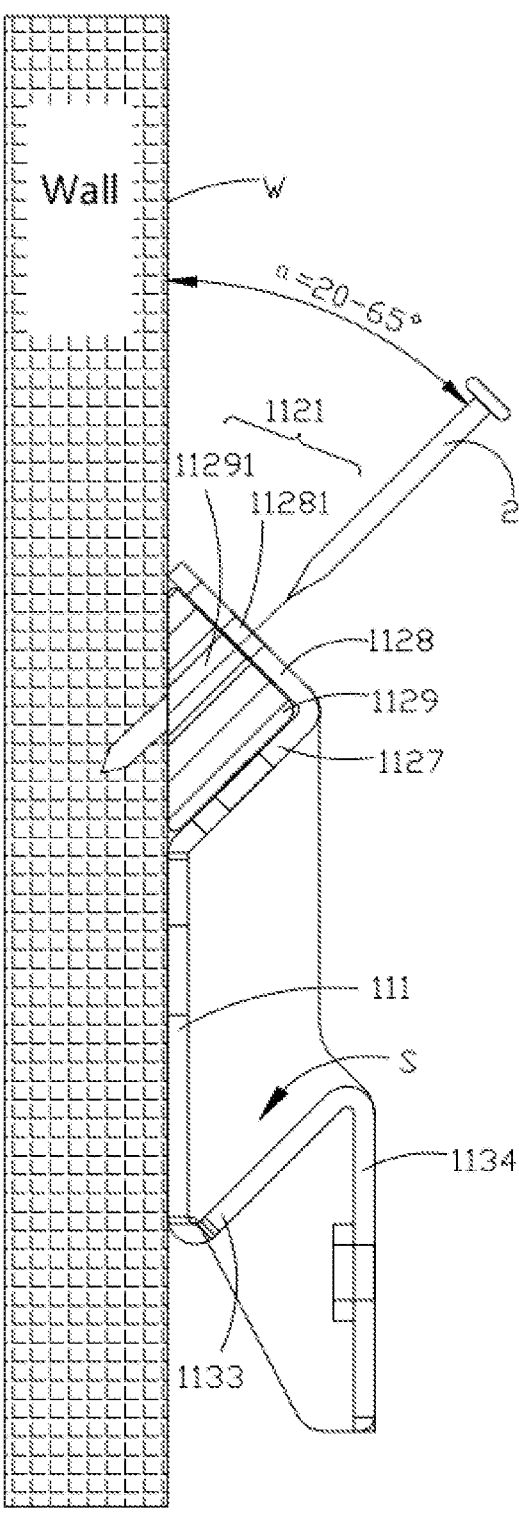
FIG. 13 shows a schematic structural diagram of mounting the first wall assembly to a wall surface.

Referring to FIGS. 9, FIG. 10, FIG. 11, FIG. 12, and FIG. 13, FIG. 9 shows a schematic structural diagram of the display mounting support in accordance with a third embodiment of the present disclosure; FIG. 10 is a schematic structural diagram of the first wall plate assembly in accordance with a third embodiment of the present disclosure; FIG. 11 is an exploded view of the display mounting support in accordance with a third embodiment of the present disclosure; FIG. 12 shows an exploded view of a hanging hook assembly in accordance with a third embodiment of the present disclosure; FIG. 13 shows a schematic structural diagram of mounting the first wall assembly 11 to a wall surface W. The display mounting support 1 of the third embodiment has a similar structure to the display mounting support 1 of the first embodiment, and the difference is that the mounting portion 112 in the third embodiment is different from the mounting portion 112 in the first embodiment, and the hanging portion 113 in the third embodiment is different from the hanging portion 113 in the first embodiment. Specifically, referring to FIG. 13, in the third embodiment, the mounting portion 112 includes a second connecting portion 1127 and a second bending portion 1128. The second connecting portion 1127 is bent and extended towards a side of the wall plate 111 far from the wall surface W. The second bending portion 1128 is bent and extended from the end of the second connecting portion 1127 far from the wall plate 111 towards the wall surface W, thereby forming a substantially V-shaped structure. The mounting portion 112 further includes a second supporting member 1129. The second supporting member 1129 is located in a space between the second bending portion 1128 and the second connection portion 1127. The second bending portion 1128 defines a plurality of fourth through holes 11281. The second supporting member 1129 defines a plurality of fifth through holes 11291. The fifth through hole 11291 is an inclined hole inclined from the top to the bottom. The fourth through hole 11281 and the fifth through hole 11291 cooperatively form the first mounting hole 1121.

Therefore, the mounting portion 112 in the third embodiment can also realize a function of fixing the display mounting support 1 to the wall surface W, and has a better load-bearing effect. Moreover, since the fifth through hole 11291 is an inclined hole inclined from top to bottom, each fastener 2 can pass through the fourth through hole 11281 and the fifth through hole 11291 in sequence. The fourth through hole 11281 and the fifth through hole 11291 enable the fastener 2 to be nailed to the wall at an inclined angle. Moreover, the fastener 2 can be nailed to the plaster boards, wooded boards, wooden studs, or a wall which has wooden studs inside and plaster boards on surface for load-bearing. The display mounting support 1 can adapt to different kinds of wall without considering the size of the gap between the wooden studs. Therefore, the display mounting support 1 can be fixed at any position of the wall, solving a problem that the traditional display mounting support cannot be mounted in the center of the wall due to the consideration of the size of the gap between the wooden studs. Moreover, due to the first mounting holes 1121 being inclined from the top and far side of the wall surface W to the bottom and near side of the wall surface W, the fasteners 2 are nailed to the wall surface W in the slanting way of which the fasteners 2 are inclined from the top and far side of the wall surface W to the bottom and near side of the wall surface W. Compared to the fasteners 2 being nailed horizontally to the wall surface, when the fasteners 2 are nailed to the wall surface W in the slanting way of which the fasteners 2 are inclined from the top and far side of the wall surface W to the bottom and near side of the wall surface W, the wall itself can provide further support to the fasteners 2, which makes the overall load-bearing performance of the display mounting support 1 better, and the load-bearing strength of the display mounting support 1 can be ensured and more stable.

In at least one embodiment, the second supporting member 1129 is in a shape of a triangular prism, which is compatible with a space between the second bending portion 1128 and the second connecting portion 1127. The second supporting member 1129 is made of a material such as plastic or rubber, which provides a cushioning effect and facilitates the machining of the fifth through hole 11291. The first wall plate assembly 11 itself is machined and molded from a metal plate such as steel. Therefore, the second bending portion 1128 can provide structural strength, and the second supporting member 1129 can provide a certain supporting effect and guiding effect. In the prior art, the first wall plate assembly generally uses aluminum profiles to punch holes, but the cost is relatively high. The present disclosure adopts the second bending portion 1128 to provide structural strength and the second supporting member 1129 to provide a certain supportive and guiding effect, which can not only ensure structural strength, but also facilitate the processing as well as the installation and can reduce the production cost.

In at least one embodiment, the fourth through hole 11281 is a straight hole, i.e., the center axis of the fourth through hole 11281 is set vertically relative to the surface of the second bending portion 1128, thereby facilitating processing of the fourth through hole 11281.

In at least one embodiment, the hanging portion 113 includes an inclined wall 1133 and a second plate 1134. The inclined wall 1133 is connected to the bottom end 1112 of the wall plate 111 and a top end of the second plate 1134. The inclined wall 1133 and the wall plate 111 cooperatively form a V-shaped groove S. A portion of the hanging hook assembly 12 is located inside the V-shaped groove S and the other portion of the hanging hook assembly 12 is located outside the V-shaped groove S. The hanging hook assembly 12 is capable of sliding along the V-shaped groove S.

In at least one embodiment, the second plate 1134 is disposed substantially parallel to the wall plate 111. Furthermore, the second plate 1134 is disposed spaced apart from the wall plate 111 so that there is a certain space between them.

Figure 14:
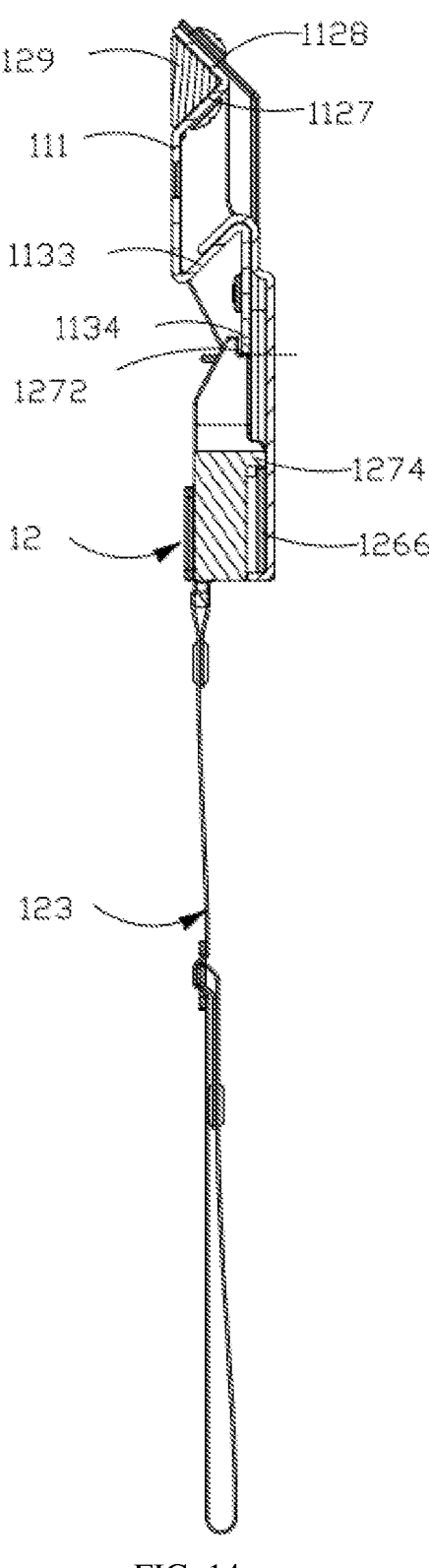
FIG. 14 shows a cross-sectional diagram of the display mounting support of FIG. 9 taken along a line XIV-XIV.
Figure 15:
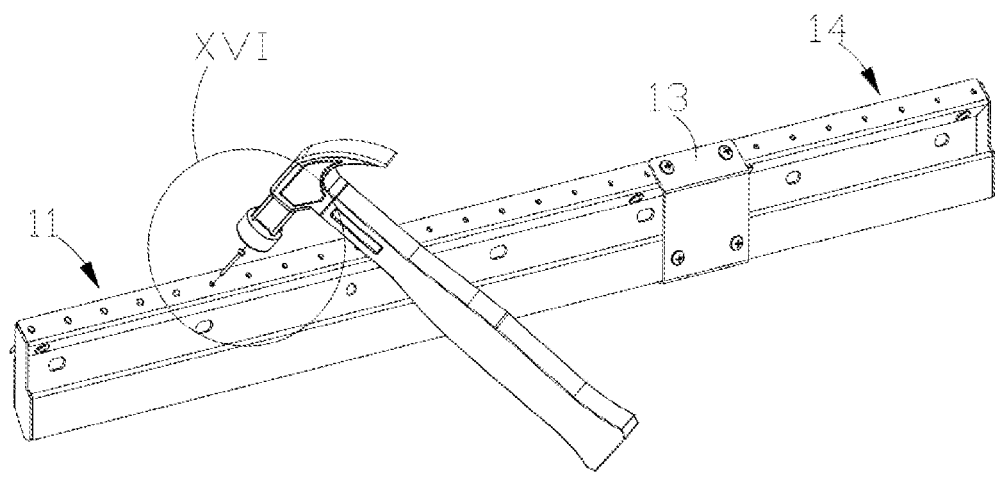
FIG. 15 shows a schematic structural diagram in which the first wall plate assembly and the second wall plate assembly are connected with a connecting member and secured to a wall surface using a hammer in accordance with a third embodiment of the present disclosure.

Referring together to FIG. 14, FIG. 14 shows a cross-sectional diagram of the display mounting support of FIG. 9 taken along a line XIV-XIV. The second plate 1134 may also serve as a limiting portion of the hanging hook assembly 12 such that a portion of the hanging hook assembly 12 is located in a space between the second plate 1134 and the wall plate 111, thereby serving as a limiting portion.

Specifically, referring again to FIGS. 11 and 12, in the third embodiment, the hanging hook assembly 12 includes a hanging hook member 126, a holding member 127, and a pull rope 123. The hanging hook member 126 includes a hanging hook body 1261, a hanging hook portion 1262 located at a top of the hanging hook body 1261, and at least one side wall portion 1263 disposed by bending and protruding from opposite sides of the hanging hook body 1261. The hanging hook body 1261 and the at least one side wall portion 1263 cooperatively form a receiving space. The holding member 127 is received in the receiving space. The holding member 127 includes a holding body 1271 and a holding part 1272 located at a top end of the holding body 1271 near a side of the hanging hook member 126. Referring to FIGS. 14 and 12 together, when the hanging hook assembly 12 is mounted to the first wall plate assembly 11, the hanging hook portion 1262 may be connected to the V-shaped groove S. The hanging hook portion 1262 may snap to the V-shaped groove S, and the holding part 1272 snaps to a side of a bottom end of the second plate 1134 near the wall surface W. A pull rope 123 is secured to the bottom end of the holding body 1271. When the pull rope 123 is pulled, the holding member 127 moves downwardly with respect to the hanging hook member 126, so that the top end of the holding part 1272 is lower than the bottom end of the second plate 1134, so that the holding part 1272 can be engaged with the second plate 1134 or, alternatively, can be disengaged from the second plate 1134.

Therefore, engagement or disengagement between the hanging hook assembly 12 and the first wall plate assembly 11 can be achieved.

In at least one embodiment, the side wall portion 1263 is in a shape of an L. Therefore, the two sidewall portions 1263 encircle the holding body 1271 like two arms, giving the holding body 1271 a guiding and limiting effect.

In at least one embodiment, referring again to FIGS. 11 and 12, the holding body 1271 defines a receiving groove 1273 on one side towards the hanging hook body 1261. The receiving groove 1273 penetrates through the bottom end of the holding body 1271 along the Z direction. The bottom end of the hanging hook body 1261 includes a convex edge 1264 that bends from the bottom end of the hanging hook body 1261 and extends toward the holding body 1271. The hanging hook assembly 12 also includes an elastic member (not shown). The elastic member is received in the receiving groove 1273. A top end of the elastic member resists against the top of the receiving groove 1273, and a bottom end of the elastic member resists against the convex edge 1264. When the pull rope 123 is pulled, the holding member 127 moves downwardly relative to the hanging hook member 126, and the elastic member is compressed. When the pull rope 123 is released, the resilient restoring force of the elastic member causes the holding member 127 to move upwardly relative to the hanging hook member 126.

Therefore, self-recovery of the initial position of the holding member 127 relative to the hanging hook member 126 is achieved through the elastic member.

In at least one embodiment, an upper surface of the convex edge 1264 coincides, or, at least partially coincides, with a projection of the receiving groove 1273 on the upper surface of the convex edge 1264. That is, the convex edge 1264 is set at the bottom end of the holding body 1271 in an area corresponding to the receiving groove 1273, and other areas are hollowed, thereby allowing for less material to be used and lower costs.

In at least one embodiment, referring to FIGS. 12 and 14 together, the hanging hook body 1261 includes a first protrusion 1265. The first protrusion 1265 is formed by recessing from a side of the hanging hook body 1261 proximate to the holding body 1271 to a side of the holding body 1271 far from the holding body 1271, and thus the part of the hanging hook body 1261 that is disposed backwardly from the first protrusion 1265 is a first groove 1266. The holding body 1271 includes a second protrusion 1274. When the holding member 127 is located in the receiving space of the hanging hook member 126, the second protrusion 1274 is located in the first groove 1266, thereby serving as a mutual guide.

In at least one embodiment, the receiving groove 1273 is also defined on the second protrusion 1274 and partially penetrates through the second protrusion 1274 from top to bottom.

In at least one embodiment, referring again to FIG. 12, the sidewall portion 1263 defines a limit slot 1267 extending along the Z-axis direction. The holding body 1271 defines a fixing hole 1278 corresponding to the limit slot 1267. The hanging hook assembly 12 further includes a limiting member 128. The limiting member 128 passes through the limit slot 1267 and is fixed in the fixing hole 1278. Therefore, the upward and downward movement of the holding member 127 relative to the hanging hook member 126 along a length of the limit slot 1267 in the Z-axis direction is limited by the limiting member 128.

In at least one embodiment, the holding part 1272 is stepped. It can be understood that in other embodiments, the holding part 1272 may be in other shapes and is not limited herein.

In at least one embodiment, the holding member 127 further includes a convex extension 1275 protruding upwardly in the Z-axis direction from opposite sides of the top of the holding body 1271, and the two convex extensions 1275 are each provided with one holding part 1272 near a side of the hanging hook body 1261, and the part between the two convex extensions 1275 is hollowed.

Therefore, the hollowed portions between the two convex extensions 1275 reduces the weight and reduces the cost.

In at least one embodiment, each convex extension 1275 includes a guiding portion 1276 having a wedged shape on a side of the convex extension 1275 far from the hanging hook body 1261.

Therefore, the guiding portion 1276 allows for quick installation of the hanging hook assembly 12 relative to the first wall plate assembly 11.

In at least one embodiment, the side wall portion 1263 includes a guiding surface 12631 having a wedged shape at a position corresponding to the guiding portion 1276.

Therefore, fast mounting of the hanging hook assembly 12 relative to the first wall plate assembly 11 can be further realized by the cooperation of the guiding portion 1276 and the guiding surface 12631.

In at least one embodiment, the bottom end of the holding body 1271 defines a second connecting hole 1277. The top end of the pull rope 123 passes through the second connecting hole 1277, and the end of the pull rope 123 that passes through the second connecting hole 1277 is snapped onto a portion of the pull rope 123 that does not pass through the second connecting hole 1277 through a snap fastener.

In at least one embodiment, referring again to FIGS. 9, 10, and 11, the wall plate 111 further defines a plurality of second mounting holes 1116. The plurality of second mounting holes 1116 are spaced apart along the X-axis direction of the wall plate 111. The second mounting hole 1116 is a waist-shaped hole for further securing the first wall plate assembly 11 by the fixing member 4.

In at least one embodiment, the fixing member 4 is a wood grain screw. In other embodiments, the fixing member 4 is other types of fasteners, such as, for example, exploding screws, which are not limited herein.

Therefore, the present disclosure retains wood grain screw mounting in addition to the use of steel nail mounting to enable the display mounting support to have more mounting ways.

In at least one embodiment, the space between two adjacent second mounting holes 1116 is 8 inches, thereby, being applicable to the installation of a wall with a center distance of 8 inches, 16 inches, or 24 inches between two adjacent wooded studs, for a wider range of applications.

In at least one embodiment, referring again to FIGS. 9, 10, and 11, the wall plate 111 further defines a third mounting hole 1117. The third mounting hole 1117 is defined at a middle position in the X-axis direction of the wall plate 111 of the first wall plate assembly 11.

When the third mounting hole 1117 of the wall plate 111 of the first wall plate assembly 11 is located just at a position of a wooden stud of the wall, the first wall plate assembly 11 can be further fixed by the fixing member 4 passing through the third mounting hole 1117.

Therefore, the second mounting holes 1116 and the third mounting hole 1117 may be alternatively selected for further fixing the first wall plate assembly 11.

Referring again to FIG. 11, the connecting member 13 in the third embodiment has a different structure than the connecting member 13 in the first embodiment. Specifically, in the third embodiment, the connecting member 13 includes a first abutting portion 131, a second abutting portion 132 and a third abutting portion 133. The first abutting portion 131 abuts against and secures to the mounting portion 112 of the first wall plate assembly 11 and the mounting portion 112 of the second wall plate assembly 14. The second abutment portion 132 abuts against adjacent outer sidewalls 115 of the first wall plate assembly 11 and the second wall plate assembly 14. The third abutment portion 133 abuts against and secures to the hanging portion 113 of the first wall plate assembly and the hanging portion 113 of the second wall plate assembly 14. However, the holding portions 134 of the connecting member 13 can be omitted.

Figure 16:
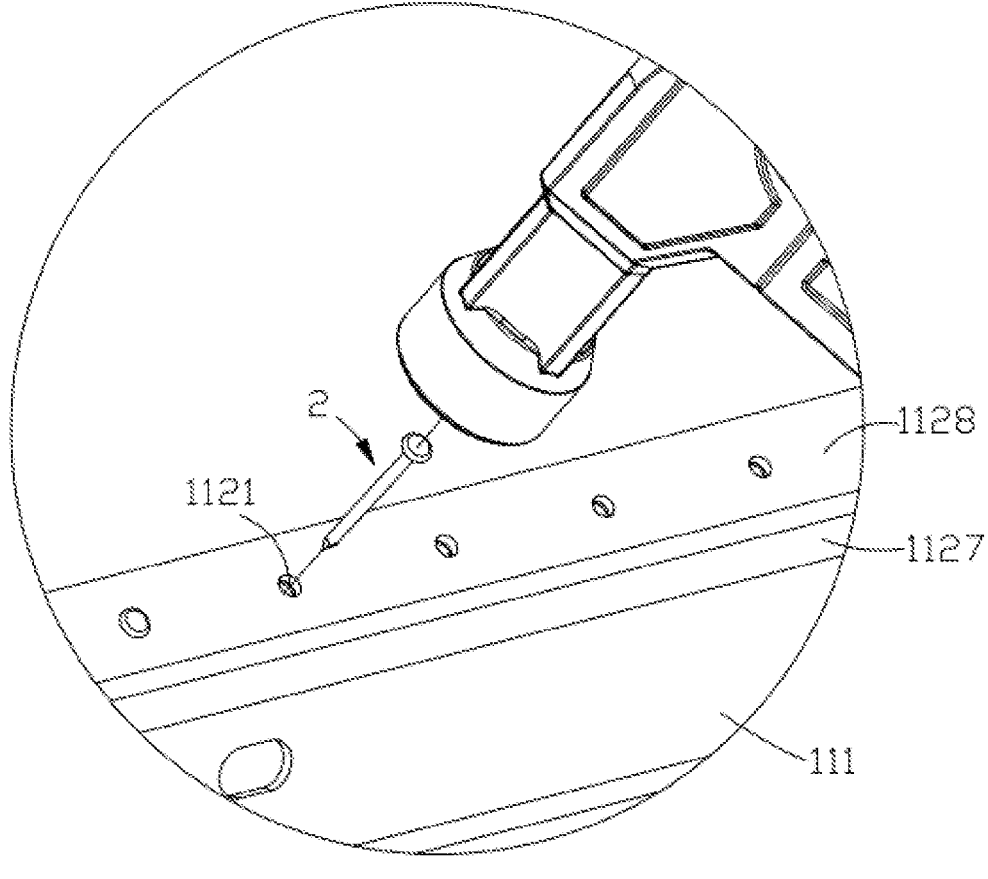
FIG. 16 shows a partially enlarged view of FIG. 15 at XVI.
Figure 17:
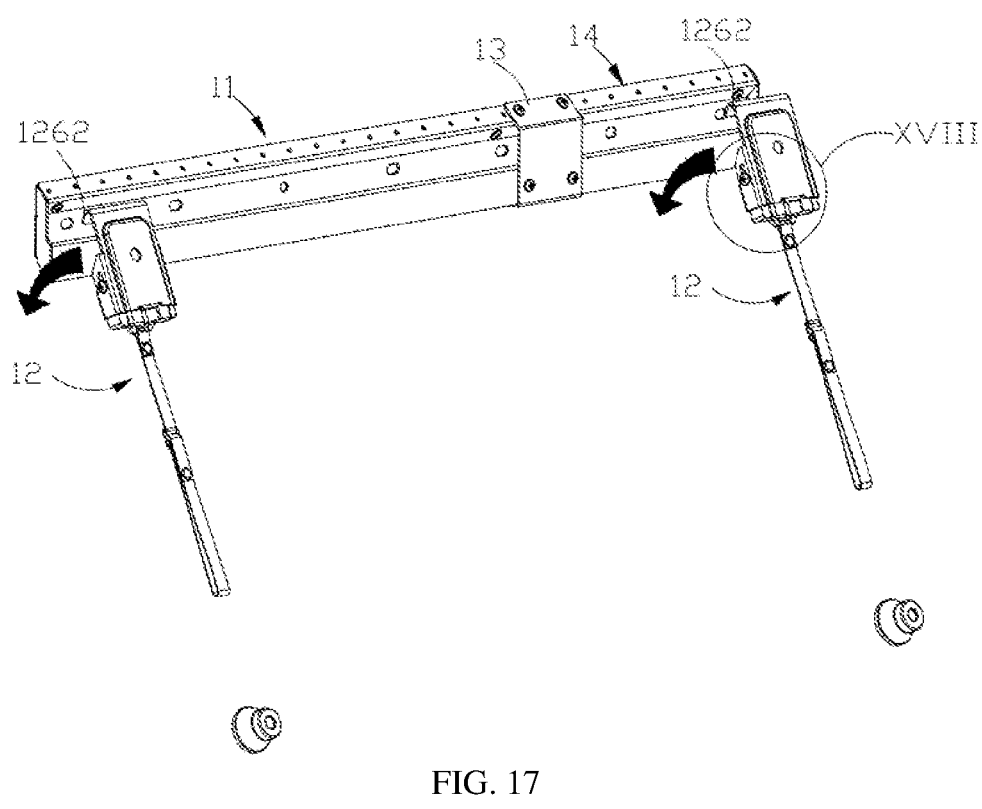
FIG. 17 shows a schematic structural diagram of the hanging hook assembly being mounted to the first wall plate assembly and the second wall plate assembly.
Figure 18:
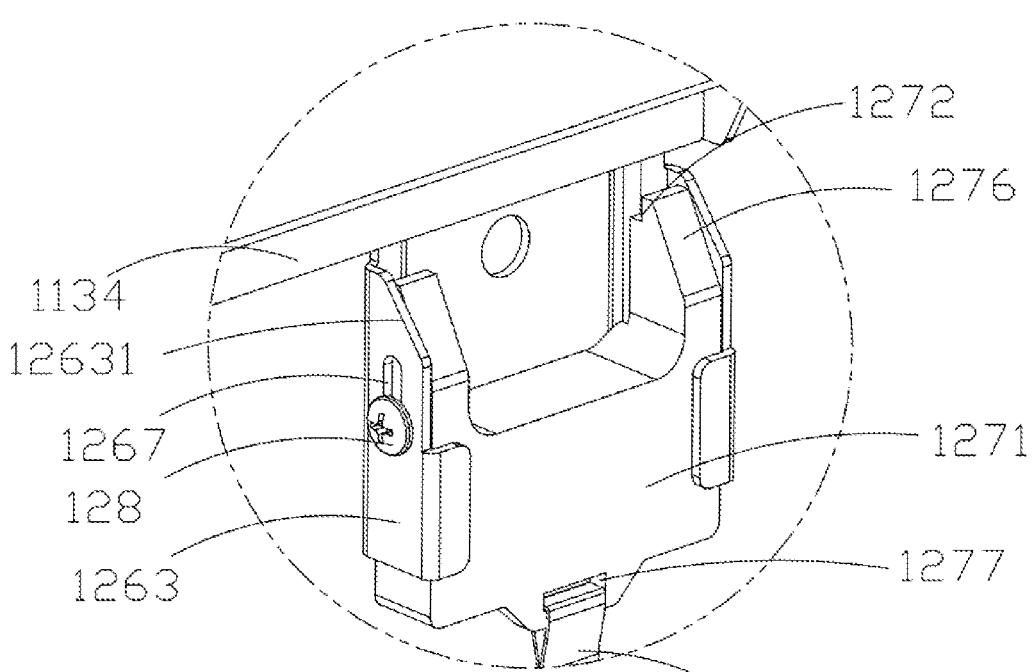
FIG. 18 shows a schematic structural diagram of the hanging hook assembly in FIG. 17 at XVIII from another view when the hanging hook assembly is not connected to the second wall plate assembly.
Figure 19:
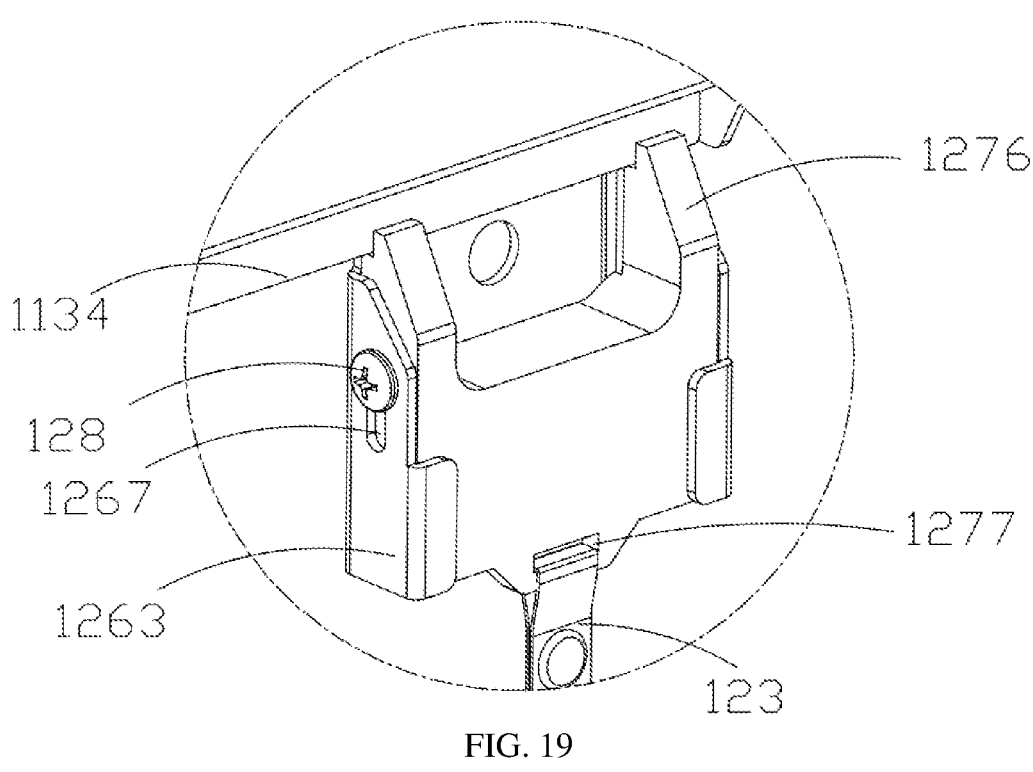
FIG. 19 shows a schematic structural diagram of the hanging hook assembly in FIG. 18 after the hanging hook assembly is connected to the second wall plate assembly.

Referring together to FIG. 15, FIG. 16, FIG. 17, FIG. 18 and FIG. 19, FIG. 15 shows a schematic structural diagram in which the first wall plate assembly and the second wall plate assembly are connected with a connecting member and secured to a wall surface using a hammer in accordance with a third embodiment of the present disclosure; FIG. 16 shows a partially enlarged view of FIG. 15 at XVI; FIG. 17 shows a schematic structural diagram of the hanging hook assembly being mounted to the first wall plate assembly and the second wall plate assembly; FIG. 18 shows a schematic structural diagram of the hanging hook assembly in FIG. 17 at XVIII from another view when the hanging hook assembly is not connected to the second wall plate assembly; FIG. 19 shows a schematic structural diagram of the hanging hook assembly in FIG. 18 after the hanging hook assembly is connected to the second wall plate assembly. When mounting, firstly, the first wall plate assembly 11 and the second wall plate assembly 14 are firstly secured by the connecting member 13, and then the fasteners 2 passing through the first mounting holes 1121 are nailed into the pre-determined positions of the wall by using a hammer. Secondly, the hanging hook assembly 12 is secured to the back 31 of the display 3. Thirdly, the display 3 together with the hanging hook assembly 12 are moved from the top down, such that the hanging hook portion 1262 of the hanging hook assembly 12 first slides into the V-shaped groove S. Fourthly, the pull rope 123 is pulled down so that the top of the holding part 1272 of the hanging hook assembly 12 is lower than the bottom of the second plate 1134. At this time, the elastic member is in a compressed state; finally, the pull rope 123 is released, the elastic restoring force of the elastic member makes the holding member 127 move upward with respect to the hanging hook member 126, thus making the holding part 1272 engaged with the second plate 1134.

When the hanging hook assembly 12 is removed from the first wall plate assembly 11 and the second wall plate assembly 14, the pull rope 123 is pulled down so that the top of the holding part 1272 of the hanging hook assembly 12 is lower than the bottom of the second plate 1134, at which time the hanging hook assembly 12 can be disengaged from the second plate 1134, and the hanging hook assembly 12 can be then removed.

In addition, since the movement of the holding member 127 relative to the hanging hook member 126 in the third embodiment is upward and downward movement, the hanging hook assembly 12 can be made thinner in the Y-axis direction, and thus, the overall thickness of the display mounting support 1 in the Y-axis direction can be reduced, and the distance of the display 3 from the wall surface W can be further reduced.

The above technical solutions and corresponding details of the subject matter of the present disclosure have been described above, and it can be understood that the above description is only some of the embodiments of the subject matter of the technical solutions of the present disclosure, and some of the details may be omitted in the specific implementation thereof.

In addition, in at least one embodiment of the above present disclosure, there are multiple embodiments of the combination of implementation possibilities, various combination programs are limited to space will not be listed. The person skill in the art can freely combine the implementation of the above embodiments according to the needs of the specific implementation, in order to obtain a better application experience.

In summary, it can be seen that the present disclosure has the above mentioned excellent characteristics, so that it can be configured to enhance the effectiveness of the previous technology, and become a very practical value of the product.

The above are embodiments of the present disclosure, and it should be noted that those skilled in the art may make some improvements and modifications without departing from the principle of the present disclosure, and these improvements and modifications are also the protection scope of the present disclosure.

What is claimed is:

1. A display mounting support, wherein the display mounting support comprises a first wall plate assembly and at least one hanging hook assembly, the at least one hanging hook assembly is configured for mounting on a back of a display;

wherein the first wall plate assembly comprises:
a wall plate, wherein the wall plate is configured to be set on a wall surface, the wall plate comprises a top end and a bottom end opposite to the top end;
a mounting portion, wherein the mounting portion is connected to the top end of the wall plate; the mounting portion defines a plurality of first mounting holes; a center axis of each first mounting hole is inclined downwardly from a top and far side of the wall surface to a bottom and near side of the wall surface; and
a hanging portion, wherein the hanging portion is connected to the bottom end of the wall plate, and the hanging portion is configured to mount the at least one hanging assembly; and
wherein: the mounting portion comprises a first connecting portion and a first bending portion, the first connecting portion is connected to the top end of the wall plate and extends from the top end of the wall plate towards a side far from the bottom end of the wall plate, the first bending portion is bent from the first connecting portion to a side far from the wall surface and inclined relative to the first connecting portion, the first connecting portion defines a plurality of first through holes, the first bending portion defines a plurality of second through holes, a first prong is formed between a connection position between the first connecting portion and the first bending portion, a distance between a center point of the first through hole and the first prong is greater than a distance between a center point of the second through hole and the first prong, and the first through hole and the second through hole together form the first mounting hole.

2. The display mounting support according to claim 1, wherein an angle between the center axis of each mounting hole and the wall surface is 20-65°.

3. The display mounting support according to claim 1, wherein: the mounting portion further comprises a first supporting member, the first supporting member is located in a space between the first bending portion and the first connecting portion, the first supporting member defines a plurality of third through holes, the third through hole is an inclined hole; and the first through hole, the second through hole and the third through hole together form the first mounting hole.

4. The display mounting support according to claim 1, wherein: the hanging portion comprises a bottom wall and a first plate, the bottom wall is bent and extended from the bottom end of the wall plate, the first plate is bent and extended from one end of the bottom wall far from the wall plate and is set in parallel with the wall plate; the wall plate, the bottom wall and the first plate together form a U-shaped groove; a portion of the hanging hook assembly is located inside the U-shaped groove and another portion of the hanging hook assembly is located outside the U-shaped groove; and the hanging hook assembly is capable of sliding along the U-shaped groove.

5. The display mounting support according to claim 1, wherein: the hanging hook assembly comprises a first housing, a second housing, a pull rope, and a torsion spring; a top end of the first housing comprises a hanging hook; a bottom end of the second housing is pivotally connected to a bottom end of the first housing; the torsion spring is located between the first housing and the second housing and adjacent the bottom end of the first housing and the bottom end of the second housing; the torsion spring comprises a first free end and a second free end; the first free end and the second free end resist between an inner wall of the first housing and an inner wall of the second housing, respectively; and the pull rope is connected to the second housing and passes through a space between the bottom end of the first housing and the bottom end of the second housing.

6. The display mounting support according to claim 1, wherein: the hanging portion comprises an inclined wall and a second plate, the inclined wall is connected to the bottom end of the wall plate and a top end of the second plate; the inclined wall and the second plate cooperatively form a V-shaped groove; and a portion of the hanging hook assembly is located inside the V-shaped groove and another portion of the hanging hook assembly is located outside the V-shaped groove, and the hanging hook assembly is capable of sliding along the V-shaped groove.

7. The display mounting support according to claim 6, wherein: the hanging hook assembly comprises a hanging hook member, a holding member and a pull rope; the hanging hook member comprises a hanging hook body, a hanging hook portion disposed at a top end of the hanging hook body and at least one sidewall portion disposed by bending and protruding from opposite sides of the hanging hook body; the hanging hook body and the at least one sidewall portion cooperatively form a receiving space; the hanging hook member is received in the receiving space; the holding member comprises a holding body, and a holding part set at a top of the holding body near a side of the hanging hook member; when the hanging hook assembly is mounted to the first wall plate assembly, the hanging hook portion is engaged with the V-shaped groove, the holding part snaps to a side of a bottom end of the second plate near the wall surface; the pull rope is connected to a bottom end of the holding body; and the pull rope is pulled downwardly which causes the holding member to move downwardly relative to the hanging hook member such that a top of the holding part is below the bottom end of the second plate.

8. The display mounting support according to claim 7, wherein: the holding body defines a receiving groove on one side towards the hanging hook body, and the hanging hook body includes a convex edge that bends from a bottom end of the hanging hook body and extends toward the holding body; the hanging hook assembly further comprises an elastic member, the elastic member is received in the receiving groove; and a top end of the elastic member resists against a top of the receiving groove, and a bottom end of the elastic member resists against the convex edge.

9. The display mounting support according to claim 7, wherein: the sidewall portion defines a limit slot; the holding body defines a fixing hole corresponding to the limit slot; the hanging hook assembly further comprises a limiting member; and the limiting member passes through the limit slot and is fixed in the fixing hole to limit a movement of the holding member relative to the hanging hook member.

10. The display mounting support according to claim 7, wherein: the holding member comprises two convex extensions protruding from opposite sides of a top of the holding body, the two convex extensions each comprises the holding part on one side near the hanging hook body, and an area between the two the convex extensions is hollowed.

11. The display mounting support according to claim 10, wherein: a side of each of the convex extension far from the hanging hook body comprises a guiding portion having a wedged shape.

12. The display mounting support according to claim 11, wherein: the sidewall portion is in a shape of an L, and the sidewall portion comprises a guiding surface having a wedged shape at a position corresponding to the guiding portion.

13. The display mounting support according to claim 1, wherein: the first wall plate assembly comprises two outer sidewalls disposed along an X-axis direction, the two outer sidewalls are disposed on opposite ends of the wall plate along the X-axis direction, and the two outer sidewalls are smoothly connected to the mounting portion and the hanging portion, respectively.

14. The display mounting support according to claim 13, wherein: the display mounting support further comprises a second wall plate assembly and a connecting member, the second wall plate assembly has a same structure as the first wall plate assembly, the connecting member comprises a first abutting portion, a second abutting portion and a third abutting portion, the first abutting portion resists against and secures to the mounting portion of the first wall plate assembly and the mounting portion of the second wall plate assembly, the second abutting portion resists against adjacent outer sidewalls of the first wall plate assembly and the second wall plate assembly, and the third abutting portion resists against and secures to the hanging portion of the first wall plate assembly and the hanging portion of the second wall plate assembly.

15. The display mounting support according to claim 14, wherein: the connecting member further comprises two holding portions located on opposite sides of the second abutting portion respectively, and the two holding portions are engaged with the wall plate of the first wall plate assembly and the wall plate of the second wall plate assembly, respectively.

16. A display mounting support, wherein the display mounting support comprises a first wall plate assembly and at least one hanging hook assembly, the at least one hanging hook assembly is configured for mounting on a back of a display;

wherein the first wall plate assembly comprises:
a wall plate, wherein the wall plate is configured to be set on a wall surface, the wall plate comprises a top end and a bottom end opposite to the top end;
a mounting portion, wherein the mounting portion is connected to the top end of the wall plate; the mounting portion defines a plurality of first mounting holes; a center axis of each first mounting hole is inclined downwardly from a top and far side of the wall surface to a bottom and near side of the wall surface; and
a hanging portion, wherein the hanging portion is connected to the bottom end of the wall plate, and the hanging portion is configured to mount the at least one hanging assembly; and
wherein: the mounting portion comprises a second connecting portion and a second bending portion; the second connecting portion bends from the wall plate and extends toward a side far from the wall surface; the second bending portion bends from one end of the second connecting portion far from the wall plate and extends toward a side near the wall surface; the second connecting portion and the second bending portion together form a V-shaped structure; the mounting portion further comprises a second supporting member; the second supporting member is located in a space between the second bending portion and the second connecting portion; the second bending portion defines a fourth through hole; the second supporting member defines a fifth through hole; the fifth through hole is an inclined hole; and the fourth through hole and the fifth through hole together form the first mounting hole.

* * * * *